(12) United States Patent
Konttinen et al.

(10) Patent No.: US 10,232,911 B2
(45) Date of Patent: Mar. 19, 2019

(54) CATAMARAN

(71) Applicant: Suomen Säiliönpääty Oy, Ylöjärvi (FI)

(72) Inventors: Tarmo Konttinen, Ylöjärvi (FI); Petri Konttinen, Ylöjärvi (FI)

(73) Assignee: SUOMEN SÄILIÖNPÄÄTY, Ylöjärvi (FI)

( * ) Notice: Subject to any disclaimer, the term of this patent is extended or adjusted under 35 U.S.C. 154(b) by 130 days.

(21) Appl. No.: 15/545,014

(22) PCT Filed: Sep. 3, 2015

(86) PCT No.: PCT/IB2015/056698
§ 371 (c)(1),
(2) Date: Jul. 20, 2017

(87) PCT Pub. No.: WO2016/097888
PCT Pub. Date: Jun. 23, 2016

(65) Prior Publication Data
US 2018/0001962 A1 Jan. 4, 2018

(30) Foreign Application Priority Data
Dec. 19, 2014 (FI) .................................... 20146118

(51) Int. Cl.
*B63B 1/20* (2006.01)
*B63B 1/32* (2006.01)
(Continued)

(52) U.S. Cl.
CPC ............... *B63B 1/20* (2013.01); *B63B 1/042* (2013.01); *B63B 1/121* (2013.01); *B63B 1/22* (2013.01);
(Continued)

(58) Field of Classification Search
CPC ........... B63B 1/20; B63B 1/042; B63B 1/121; B63B 1/22; B63B 1/322
See application file for complete search history.

(56) References Cited

U.S. PATENT DOCUMENTS 1,738,979 A 12/1929 Adelmann et al.
2,666,406 A 1/1954 Babcock
(Continued)

OTHER PUBLICATIONS

Office Action—Opinion on Patentivity in Finish Patent Application 20146118, Finish Patent Registry Board, dated Mar. 10, 2015.
(Continued)

*Primary Examiner* — Stephen P Avila

(57) ABSTRACT

A catamaran (100) which has a center tunnel (102), the opposite sides (105a, 105b) of which form asymmetrical pontoons (106a, 106b), which are mirror images of each other, and which pontoons (106a, 106b) have buoyancy, which has been adapted so that when the catamaran (100) moves in water, the center tunnel (102) functions as a combined water and air tunnel. When the catamaran (100) is stationary in water, the ceiling (108) of the center tunnel (102) is in water. The ceiling (108) of the center tunnel further curves in a cylindrically convex manner downwards when going from the bow (116) to the direction of the stern (118) only after an essentially horizontal portion (401) of a distance (d), which essentially horizontal portion (401) is located between the pontoons (106a, 106b).

13 Claims, 7 Drawing Sheets

(51) Int. Cl.
  *B63B 1/04*   (2006.01)
  *B63B 1/12*   (2006.01)
  *B63B 1/22*   (2006.01)
  B63B 1/10     (2006.01)
  B63B 3/08     (2006.01)

(52) U.S. Cl.
  CPC .............. *B63B 1/322* (2013.01); *B63B 1/107* (2013.01); *B63B 2003/085* (2013.01); *Y02T 70/12* (2013.01)

(56)         References Cited

U.S. PATENT DOCUMENTS 3,046,926 A      7/1962   Miller
  3,077,851 A      2/1963   Bamberger
  3,470,839 A     10/1969   Faul et al.
  3,745,963 A *    7/1973   Fisher ..................... B63B 1/18
                                                            114/288
  4,091,761 A      5/1978   Fehn
  5,458,078 A     10/1995   Perette

OTHER PUBLICATIONS

Office Action on Opinion on Patentivity, in Finish Patent Application 20146118, Finish Patent Registry Board, dated Oct. 24, 2016.
International Search Report from PCT Application, PCT/IB2015/056698, EPO, dated Jan. 29, 20161.

* cited by examiner

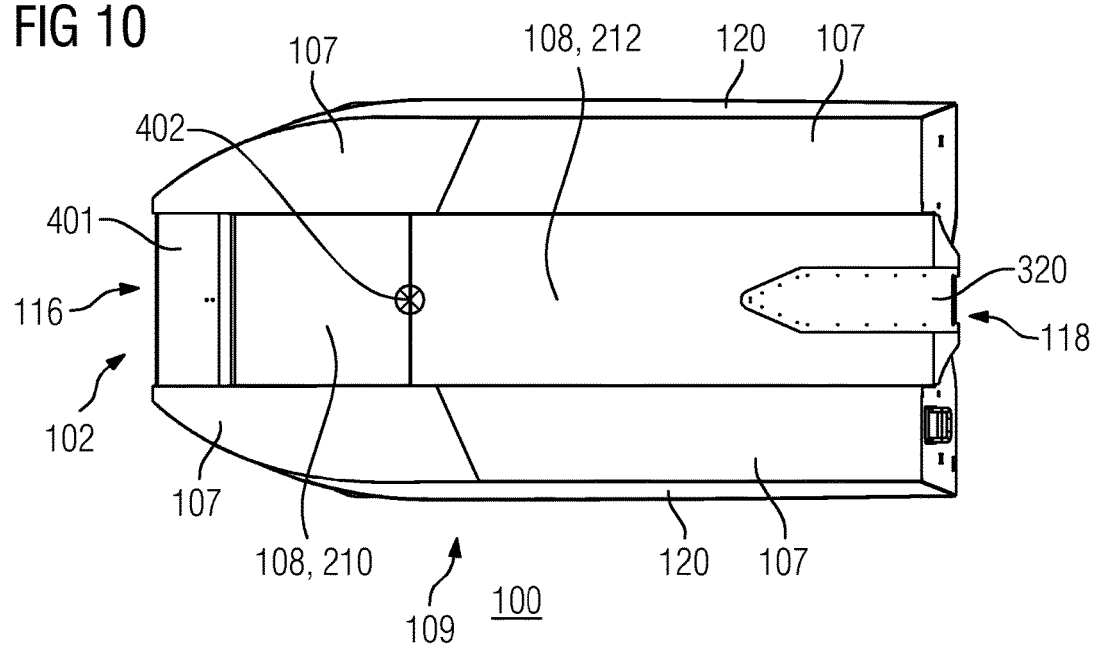
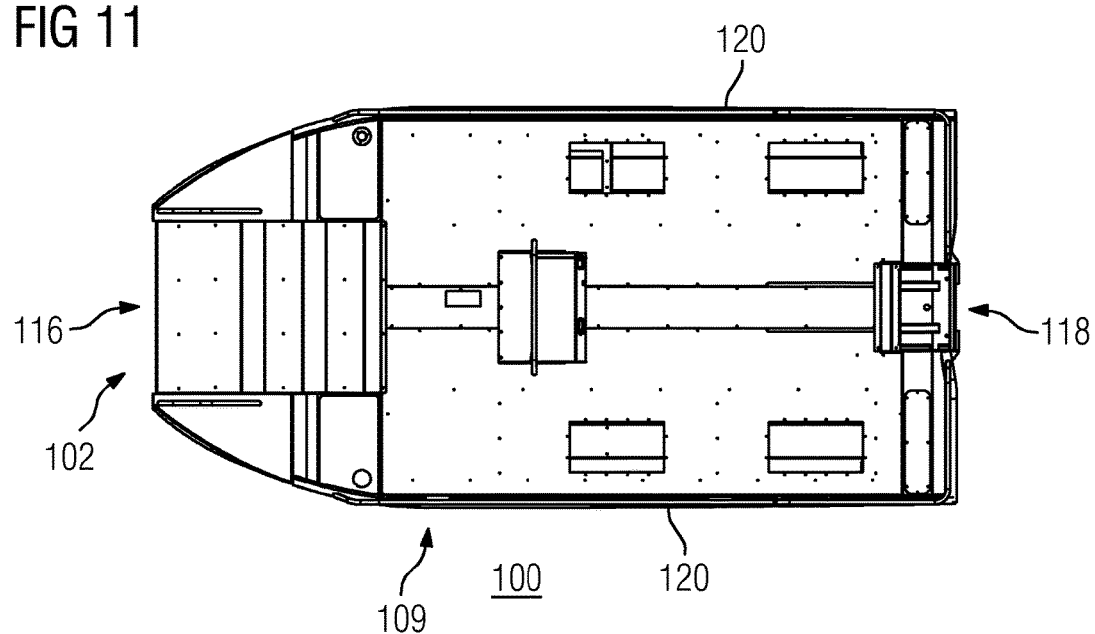

and the stern and in their width direction between the# CATAMARAN

FIELD OF INVENTION

The invention is related to a catamaran that has a centre tunnel.

TECHNICAL BACKGROUND

A boat with a centre tunnel that combines two hulls together is called a catamaran. A catamaran is typically motor-powered. The manoeuvrability of a catamaran is determined by many factors. In a two-hull structure, both hulls cause friction, which reduces the transmission of the power produced by the motor into the motion of the boat.

OBJECTIVE OF INVENTION

The present invention relates to a catamaran according to the independent claim. The embodiments according to the invention have been defined in the dependent claims.

ADVANTAGES OF INVENTION

The advantage of a catamaran according to the invention is that the catamaran is stable when it is being loaded, and during driving the friction with water is small. In this way, it is possible to transmit the power of the motor efficiently into the motion of the boat, and it is possible to achieve high speeds even with a small motor.

A catamaran has a centre tunnel, the opposite sides of which form asymmetrical pontoons, which are mirror images of each other, and which pontoons have buoyancy, which has been adapted so that when the catamaran moves in water, the centre tunnel functions as a combined water and air tunnel. When the catamaran is stationary in water, the ceiling of the centre tunnel is in water. Moreover, the ceiling of the centre tunnel curves in a cylindrically convex manner downwards when going from the bow to the direction of the stern only after an essentially horizontal portion of a distance, which portion is located between the pontoons. The air that travels through the mouth of the centre tunnel of such catamaran may be carried to under the catamaran over distance d before it is being started to restrain downwards on the cylindrically convex ceiling. In this case, air that has been led between the pontoons up to the distance can no longer escape in the vertical and lateral directions. By means of a cylindrically convex ceiling, it is possible to restrain and guide air towards water, preventing the free flow of air. When the flow of air slows down when hitting water, the static pressure on the lower side of the ceiling of the centre tunnel of the catamaran may increase (the phenomenon here is ground effect). The closer the ceiling of the centre tunnel moves from the surface of water, the greater the slowing of the flow and the increase in the static pressure below the ceiling of the centre tunnel of the catamaran caused by it may be. In this case, it is possible to achieve lift even at small speeds, when the ceiling of the centre tunnel is still almost in water. Moreover, it is possible to decrease the hitting of the ceiling of the centre tunnel with the waves by taking the curving of the ceiling of the centre tunnel towards the stern, in which case the buoyancy of the pontoons may begin to lift the bow before a wave hits the ceiling of the centre tunnel.

Both pontoons have a bottom comprising a straight portion and a curved portion located at the bow side from the straight portion. The curved portion of the bottom is inclined in the width direction of the catamaran at an angle upwards from the plane of the normal of the examination point at the edge of the surface of the side when the angle opens to the direction of a shell plate, and which curved portion of the bottom in the area of the bow of the catamaran from the stern to the direction of the bow has been curved upwards and essentially at the same time turned inwards so that said angle increases when moving from the area of the stern of the catamaran to the area of the bow. So it is possible to improve the manoeuvrability of the catamaran at smaller speeds, and on the other hand with the cutting bow it is possible to improve the penetrating capacity of the bow in rough sea. Because of centrifugal force, a catamaran tends to lean outwards in a bend, just like a ship. It is possible to compensate for this lean by means of a small inclination of the bottom of the pontoons, which inclination opens outwards, in which case, when turning in a bend, the displacement of the pontoon on the side of the outer bend increases and correspondingly, the displacement of the pontoon on the side of the inner bend decreases. When the lean remains small, the horizon does not disappear behind the bow of the hull of the catamaran, and visibility in all directions can be maintained. By keeping the inclination of the inclined bottom small, it is further possible to lower the planing threshold of the catamaran and to reduce the displacement of the catamaran at the cruising speed, in which case the wave formation of the catamaran is reduced.

When the centre tunnel has in the longitudinal direction of the catamaran two consecutive portions, of which the bowmost portion is at a greater angle towards the bow than the stern-most portion, it is possible to restrict air under the centre tunnel in order to accomplish lift.

When the bow-most portion located closest to the bow is shorter than the stern-most portion located closest to the stern and the stern-most portion located closest to the stern extends from the bow-most portion located closest to the bow towards the stern, it is possible to lengthen the lift effect area of the centre tunnel.

When the pontoons have elongated water guide plates, which extend in their longitudinal direction between the bow and the stern and in their width direction between the pontoons, it is possible to improve the lift of the centre tunnel by guiding water downwards.

When the distance of the water guide plates to the ceiling of the centre tunnel is reduced from the bow towards the stern, it is possible to trim the longitudinal balance position of the catamaran and to improve the lift of the centre tunnel at the stern.

When the catamaran has a water guide module on the ceiling of the centre tunnel in order to accomplish a laminar flow to the propeller of an outboard motor, the cavitation plate of which outboard motor is behind the water guide module, it is possible to improve the propulsive force of the propulsion device.

When the catamaran has uniform shell plates on the outer edges of the pontoons, which shell plates combine to each other the structures above and beneath the deck from the bow to the stern, it is possible to simplify manufacture, especially if the hull material is for example aluminium.

When the sides of the catamaran are essentially vertical, planar and parallel over the entire length of the centre tunnel, it is possible to reduce turbulence in the centre tunnel, and on the other hand the straight sides together with an almost vertical shell plate and an inclined bottom improve the longitudinal directional stability and manoeuvrability of the catamaran, and reduce the drift caused by wind especially at low speeds.

When the height of the mouth of the centre tunnel becomes lower after the essentially horizontal portion over a distance so that on the stern-most portion located closest to the stern, the distance of the centre tunnel from the bottom of the pontoons is at its highest less than 50% of the height of the mouth of the bottom tunnel at the bow, in which case the intense curving of the ceiling of the centre tunnel in a cylindrically convex manner downwards functions as a ram air wing, it is possible to increase the static pressure of air under the ceiling of the centre tunnel of the catamaran.

When there is a point of intersection between the surfaces of the stern-most portion and the bow-most portion of the ceiling of the centre tunnel, at which point of intersection the gradients of the surfaces of the stern-most portion and the bow-most portion are equally great, and at which point of intersection the distance of the ceiling of the air tunnel from the bottom of the pontoons is greater than the distance of the ceiling of the air tunnel from the bottom of the pontoons at the stern, it is possible to improve the air intake and lift of the centre tunnel even at small speeds. Moreover, when the bottoms of the pontoons swim deeper at the bow than at the stern, it is possible to improve the turning of the catamaran especially at small speeds, in which case the bow portions of the pontoons are still in water.

When the pontoons and the ceiling of the centre tunnel of the catamaran have been manufactured from aluminium and belong to the hull of the catamaran, which hull has been manufactured from aluminium, it is possible to manufacture a catamaran where durability, light weight and simplified design are combined.

LIST OF DRAWINGS

The invention is described below in more detail in connection with preferred embodiments by making reference to the accompanying drawings, in which:

FIG. 10 shows a catamaran illustrated directly from below, according to one embodiment; and FIG. 11 shows a catamaran illustrated directly from above, according to one embodiment.

The same reference numbers refer to the same or corresponding technical characteristics in all drawings.

DETAILED DESCRIPTION OF THE INVENTION

Figure 1:
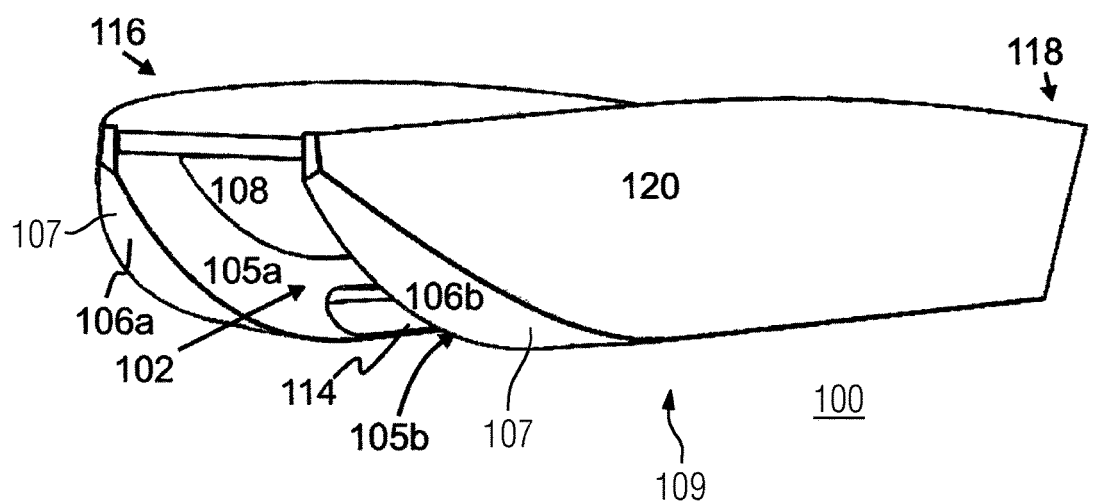
FIG. 1 shows a catamaran illustrated diagonally from the front, according to one embodiment.
Figure 2A:
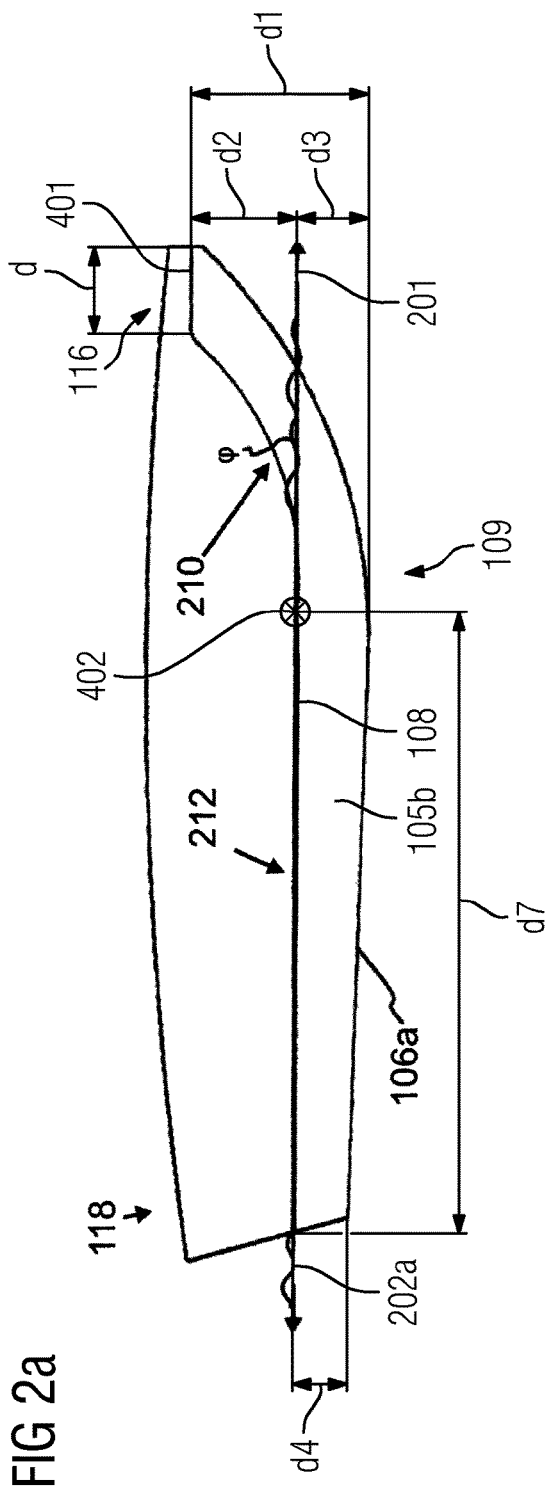
FIG. 2a shows a cross-section of a catamaran that is stationary in water.
Figure 2B:
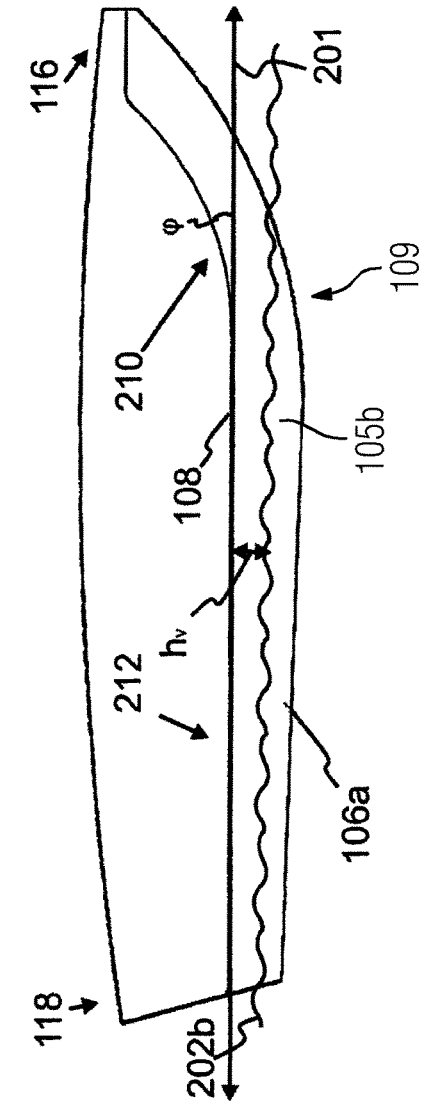
FIG. 2b shows a cross-section of a catamaran during driving.

In what follows, a catamaran 100 is described by making reference to FIG. 1, FIG. 2a, FIG. 2b and FIG. 3.

A catamaran 100 has a centre tunnel 102, the opposite sides 105a, 105b of which form asymmetrical pontoons 106a, 106b, which are mirror images of each other in respect of the longitudinal direction 201 of the catamaran. The bottoms 107 of the pontoons 106a, 106b are towards water 202a, 202b. The centre tunnel 102 has mouths at the bow 116 and at the stern 118. The centre tunnel 102 has a ceiling 108 of the centre tunnel, which ceiling 108 is off water 202b during driving, and when the catamaran 100 is stationary, the ceiling 108 of the centre tunnel is in water 202a. During driving, the centre tunnel 102 functions as a combined water and air tunnel, in which case both water and air travel through the centre tunnel 102. When moving forward, water and air enter the centre tunnel 102 from the bow 116 and come out of the stern 118. During driving, there is therefore a distance $h_v$ between water 202b and the ceiling 108 of the centre tunnel.

The opposite sides 105a, 105b of the centre tunnel 102 function as the inner sides of the pontoons 106a, 106b. The outer sides of the pontoons 106a, 106b are composed of the outer shells of the catamaran. The outer shells are preferably uniform shell plates 120, which combine to each other the structures above and beneath the deck from the bow 116 to the stern 118. The inner sides 105a, 105b can be vertical, and the outer shells 120 can be slightly inclined in respect of the vertical.

In one embodiment, the centre tunnel 102 of the catamaran 100 has in the longitudinal direction 201 of the catamaran 100 two consecutive portions, of which the bow-most portion 210 is at a greater angle 9 towards the bow 116 than the stern-most portion 212. In this way, it is possible to get the air mass received at the bow 116 of the catamaran 100 forced between the ceiling 108 of the centre tunnel and water and to make the centre tunnel 102 to function as a combined water and air tunnel. Of the two consecutive portions 210, 212 of the centre tunnel 102, the bow-most portion 210 is therefore closer to the bow 116 and the stern-most portion 212 is closer to the stern 118. The portions 210, 212 are preferably arranged in respect of the stern 118 and the bow 116 so that the pressure of the air mass in the centre tunnel 102 increases from the bow 116 to the stern 118. The longitudinal direction 201 of the catamaran 100 can be defined as a direction running from the stern 118 to the bow 116.

Each portion 210, 212 is composed of the ceiling 108 of the centre tunnel and of the opposite sides 105a, 105b of the pontoons 106a, 106b located around the ceiling 108 of the centre tunnel. The pontoons 106a, 106b of the catamaran 100 border the bow-most portion 210 and the stern-most portion 212 in the width direction 302 of the catamaran 100, in which case when the catamaran 100 is driven, the bow 116 of the catamaran 100 collects in the centre tunnel 102 an air mass, and the centre tunnel 102 guides the air mass so that the air mass received at the bow 116 comes out from the mouth of the centre tunnel 102 on the side of the stern 118. The angle φ towards the bow 116 can be defined as an angle of the ceiling 108 of the centre tunnel in relation to the longitudinal direction 201 of the catamaran 100, which longitudinal direction 201 runs from the stern 118 to the bow 116.

In one embodiment, the bow-most portion 210 located closer to the bow 116 is shorter than the stern-most portion 212 located closer to the stern 118 and the stern-most portion 212 located closer to the stern 118 extends from the bow-most portion 210 located closer to the bow 116 towards the stern 118. In this way, even at small driving speeds, it is possible to make the centre tunnel 102 to function as a combined air and water tunnel.

The above-described settings of the portions 210, 212 of the centre tunnel 102 enable the functioning of the centre tunnel 102 as a ram air wing, which produces, when the catamaran 100 is driven, an air pressure, which increases with the driving speed, between the catamaran 100 and water.

In one embodiment, the pontoons 106a, 106b of the catamaran 100 have elongated water guide plates 114, which extend in their longitudinal direction between the stern 118 and the bow 116 and in their width direction 302 between the pontoons 106a, 106b. When the catamaran 100 is driven, the water guide plates 114 turn the flow of the water flowing through the centre tunnel 102 downwards, in which case buoyancy or lift is created. In other words, the water flowing through the centre tunnel 102 tends to rise up and the water guide plates 114 turn the water, which tends to rise up, at a desired angle back downwards, in which case more buoyancy or lift and a water mass of the correct direction before the propeller are obtained. The turning of the flow direction of water reduces the splashing of water upwards at the stern 118 when the catamaran 100 is driven and water discharges out of the centre tunnel 102. When the catamaran 100 is driven, there is air between the water guide plates 114 and the ceiling 108 of the centre tunnel, in which case the centre tunnel 102 forms an air tunnel from the bow 116 to the stern 118. When the catamaran 100 is driven, the water flowing through the centre tunnel 102 travels in the centre tunnel 102 in the height direction at the level of the water guide plates 114 and under them. Since the ceiling 108 of the centre tunnel is off water 202b when driving, there is no friction with the movement of the catamaran 100 over its portion. In this way, it is possible to obtain a high efficiency of the power transmitted from the motor into motion.

The water guide plates 114 extend in the longitudinal direction 201 of the catamaran 100 on both sides of the centre tunnel 102 towards the centre of the centre tunnel 102 in the width direction 302 of the catamaran 100. The length and width of the water guide plates 114 can be dimensioned on the basis of the purpose of use of the boat, such as the necessary load-carrying capacity and driving speed. Distance $h_1$ between the ceiling 108 of the centre tunnel and the water guide plates 114 decreases from the bow 116 towards the stern 118. During driving, $h_l$ is essentially $h_v$. On the outer sides of the pontoons 106a, 106b, on the shell plates 120 of the catamaran, the water line runs at the uppermost point of the bottom angle, in other words approximately at the level of the outer edge, where the bottom 107 and the shell plate 120 meet each other. The water guide plates 114 can be installed at a constant distance from the bottom 107 of the pontoons 106a, 106b. In this way, the displacement of the catamaran 100 is very small when driving. The rise of water, in other words the height of water is on the inner sides 105a, 105b of the pontoons 106a, 106b below the water guide plates 114. On the outer sides of the pontoons 106a, 106b, in other words on the shells of the catamaran 100, the height of water is lower than on the inner sides 105a, 105b. On the other hand, when the catamaran 100 is driven, an air mass is pressed between the ceiling 108 of the centre tunnel and water, the buoyancy effect of which air mass increases from the bow 116 of the boat to the stern 118 as the distance between the ceiling 108 of the centre tunnel and the water guide plates 114 decreases. The shape of the water guide plate 114 is preferably the shape of the bottom 107 of the pontoon 106a, 106b in the travel direction of the boat. In this way, when the catamaran 100 is driven, the water guide plate 114 cuts the water mass that "climbs" along the vertical inner wall 105a, 105b of the pontoon 106a, 106b. It is possible to preferably shape the water guide plate 114 to be curved. The water guide plate 114 can be curved, for example convex, upwards towards the ceiling 108 of the centre tunnel, in which case it is possible to make the water mass travelling from under the water guide plate 114 large without increasing the size of the water guide plate 114 in the width direction 302 of the catamaran 100.

In one embodiment, the catamaran 100 has a water guide module 320 on the ceiling 108 of the centre tunnel 102 in order to accomplish a laminar flow to the propeller of an outboard motor, the cavitation plate of which outboard motor is behind the water guide module 320. The water guide module 320 guides the water mass flowing in the centre tunnel 102 from the bow 116 towards the stern 118 so that the collision of the water mass and the outboard motor above the propeller can be prevented completely or at least partially. By means of the water guide module 320, it is possible to guide the water mass coming from the bow 116 direction laminarily past the outboard motor, in other words "beside" it, on both sides to a free air space. In this case, the resistance of water encountered by the outboard motor is reduced essentially and the total efficiency of the propulsive force increases. In other words, the outboard motor obtains a "pure", unmixed water mass laminar in the direction of the boat, in which case it does not cavitate easily and the propeller does not need to do extra work in order to direct the flow of water to the desired direction of propulsion. Owing to the water guide module 320, it is possible to reduce the planing of the boat in a direction diverging from the course, in which case the accuracy of driving of the catamaran 100 improves.

In one embodiment, the catamaran 100 has uniform shell plates 120, which combine to each other the structures above and beneath the deck from the bow 116 to the stern 118. The shell plates 120 extend in the vertical direction from the bottom 107 of the pontoons 106a, 106b upwards preferably to a height, which is higher than the deck level, in which case the shell plates 120 form edges and prevent water, for example splashes or flowing water, from getting to the deck from a level higher than the deck plate. The structures below the deck can comprise one or more of the following: bottoms 107 of the pontoons 106a, 106b, sides 105a, 105b of the pontoons, ceiling 108 of the centre tunnel 102. The parts above the deck can comprise one or more of the following: deck plate and stern board.

In addition to what has been described above, it can be seen in FIG. 1 and FIG. 2a that the ceiling 108 of the centre tunnel curves in a cylindrically convex manner downwards when going from the bow 116 to the direction of the stern 118 only after an essentially horizontal portion 401 of distance d, which essentially horizontal portion 401 is located between the pontoons 106a, 106b. The length d of the essentially horizontal portion 401 can be preferably 300-1000 mm. In one embodiment, the length d is most preferably 500 mm. The radius of the cylindrically convex curving of the ceiling 108 of the centre tunnel can be 1200-1600 mm. In one embodiment, the radius of the cylindrically convex curving is most preferably 1400 mm. The sides 105a, 105b are essentially vertical, planar and parallel over the entire length of the centre tunnel 102.

The prismatic coefficient of the displacement of the pontoons 106a, 106b can be greater than conventional V-bottom catamarans, because the cross-section of the pontoons 106a, 106b on the straight area of the bottom 107 of the pontoons 106a, 106b is almost a rectangular quadrangle.

Most preferably, the prismatic coefficient of the cross-section of the pontoons 106a, 106b on the straight area of the bottom 107 can be over 0.9.

The width of the pontoon at the height of the ceiling 108 of the centre tunnel 102 can be 300-1000 mm. In one embodiment, the width d5 of the pontoon at the height of the ceiling 108 of the centre tunnel 102 can be most preferably 550 mm.

The height d1 of the mouth of the centre tunnel 102 can become lower after the essentially horizontal portion 401 over distance d2 so that on the stern-most portion 212 located closest to the stern 118, the distance d3 of the centre tunnel 102 from the bottom 107 of the pontoons 106a, 106b is at its highest less than 50% of the height d1 of the mouth of the bottom tunnel at the bow 116. There is a point of intersection 402 between the surfaces of the bow-most portion 210 and the stern-most portion 212 of the ceiling 102 of the centre tunnel 102, at which point of intersection 402 the gradients of the surfaces of the bow-most portion 210 and the stern-most portion 212 are equally great. At the point of intersection 402, the distance d3 of the ceiling 108 of the air tunnel 102 from the bottom 107, 107b of the pontoons 106a, 106b is greater than the distance d4 of the ceiling 108 of the air tunnel from the bottom 107 of the pontoons 106a, 106b at the stern 118. In one embodiment, the distance d4 of the ceiling 108 of the centre tunnel from the bottom 107 of the pontoons 106a, 106b is most preferably 275 mm and at the point of intersection 402 most preferably 372 mm.

The pontoons 106a, 106b can have elongated water guide plates 114, which extend in their longitudinal direction between the stern 118 and the bow 118 and in their width direction between the pontoons 106a, 106b. The distance of the water guide plates 114 to the ceiling 108 of the centre tunnel decreases from the bow 116 towards the stern 118.

In addition to what has been described above, it can be seen that FIG. 2b shows a catamaran 100 in a driving situation, where the ceiling 108 of the centre tunnel 102 has come completely off water 202b. In the centre tunnel 102 in the longitudinal direction of the catamaran 100 there are two consecutive portions, of which the bow-most portion 210 is at a greater angle φ towards the bow 116 than the stern-most portion 212. The bow-most portion 210 located closest to the bow 116 is shorter than the stern-most portion 212 located closest to the stern 118 and the stern-most portion 212 located closest to the stern 118 extends from the bow-most portion 210 located closest to the bow 116 towards the stern 118. In one embodiment, the length d7 of the stern-most portion located closest to the stern 118 is most preferably 3200 mm.

Figure 3:
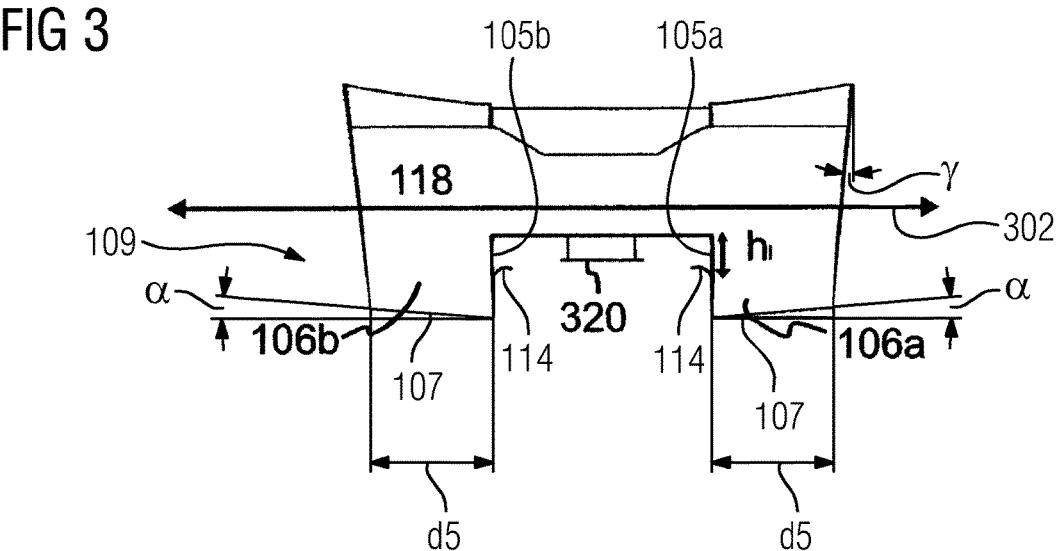
FIG. 3 shows a catamaran illustrated from the back.
Figure 5:
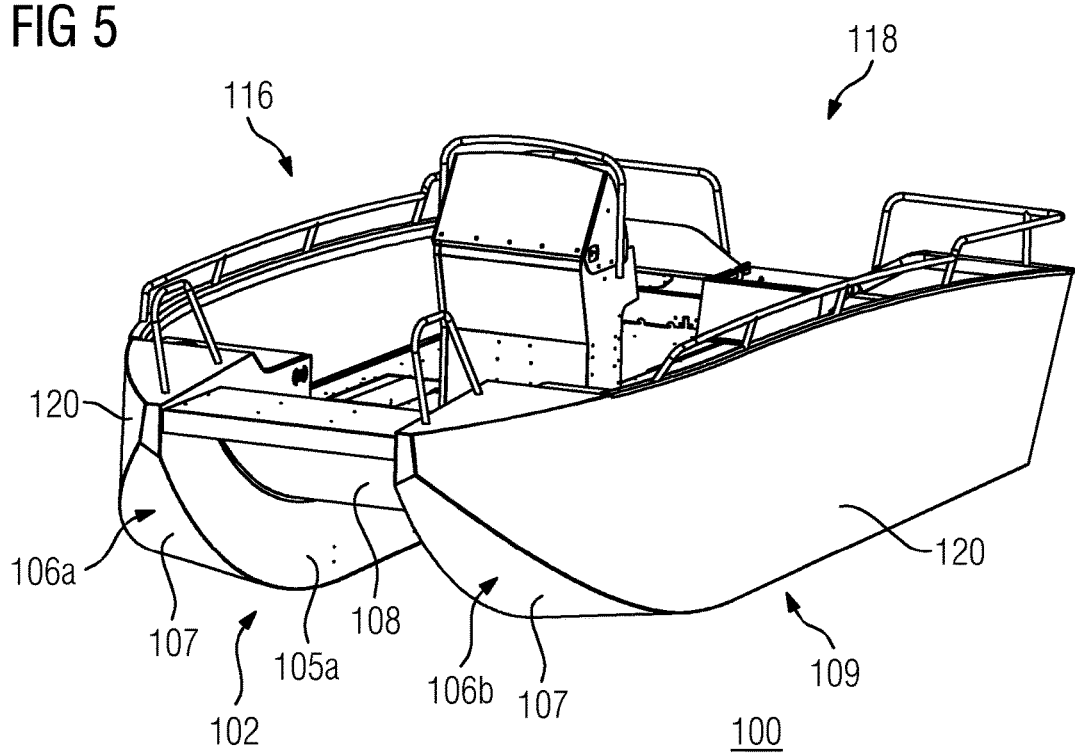
FIG. 5 shows a catamaran illustrated diagonally from the front, according to one embodiment.

FIG. 3, FIG. 5 show a catamaran 100, where both pontoons 106a, 106b further comprise an inclined bottom 107, which is in the width direction 302 of the catamaran 100 at angle α upwards from the plane of the normal of the examination point at the edge of the surface of the side 105a, 105b when the angle α opens to the direction of the shell plate 120. The inclined bottom 107 in the area of the bow 116 of the catamaran 100 from the stern 118 to the direction of the bow 116 has been curved upwards and essentially at the same time turned inwards so that said angle α increases when moving from the area of the stern 118 of the catamaran 100 to the area of the bow 116. The angle α is at its greatest in the centre part of the curved bottom 107 (see FIG. 7). The angle α of the inclined bottom 107 on the straight portion can be 2-6°. In one embodiment, the angle α is most preferably 4°. On the area of the curved bottom 107, the angle α can vary between 6-12°. In one embodiment, the angle α is most preferably between 8-10°.

The catamaran 100 can start to plane without a planing threshold, because the shape of the bottom 107 is such that when starting to move from a stationary position, there are really no forces at the bottom 107 in the travel direction that resist water. In this case, the power of the engine can be utilised almost entirely in order to achieve the planning threshold.

The catamaran 100 can stop without the sinking of the stern and the creation of a wash. The catamaran 100 does not necessarily displace almost any water to the sides. This is why the entire bottom 107 carries the catamaran 100, and when stopping and accelerating, the bearing surface of the catamaran 100 is almost as long as the entire catamaran 100, in which case the catamaran 100 sinks into water evenly over the length of its entire hull 109. In comparison, in a V-hull boat the stern is load-bearing. This may cause the stern to sink, because the bearing surface area is at the stern when accelerating and braking.

The catamaran 100 can turn in waves without hitting the waves, because water is not moved to the side, but it is allowed to travel in the direction of the bottom of the catamaran 100 through the catamaran 100.

Figure 4:
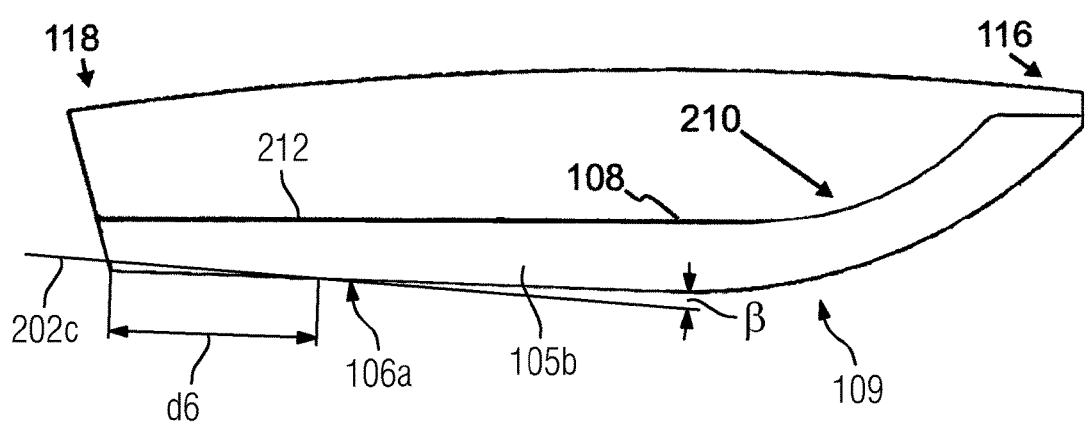
FIG. 4 shows a cross-section of a catamaran during driving at cruising speed, according to one embodiment.

FIG. 4 shows a situation where the catamaran 100 is moving at cruising speed. In this case, the length d6 of the wet surface of the bottom 107 of the pontoons 106a, 106b can be, with a total weight of 1000 kg of the catamaran, approximately 1 m and at top speed only as little as 0.6 m. At top speed, the angle β between the bottom 107 and water can be approximately 4 degrees.

Figure 6:
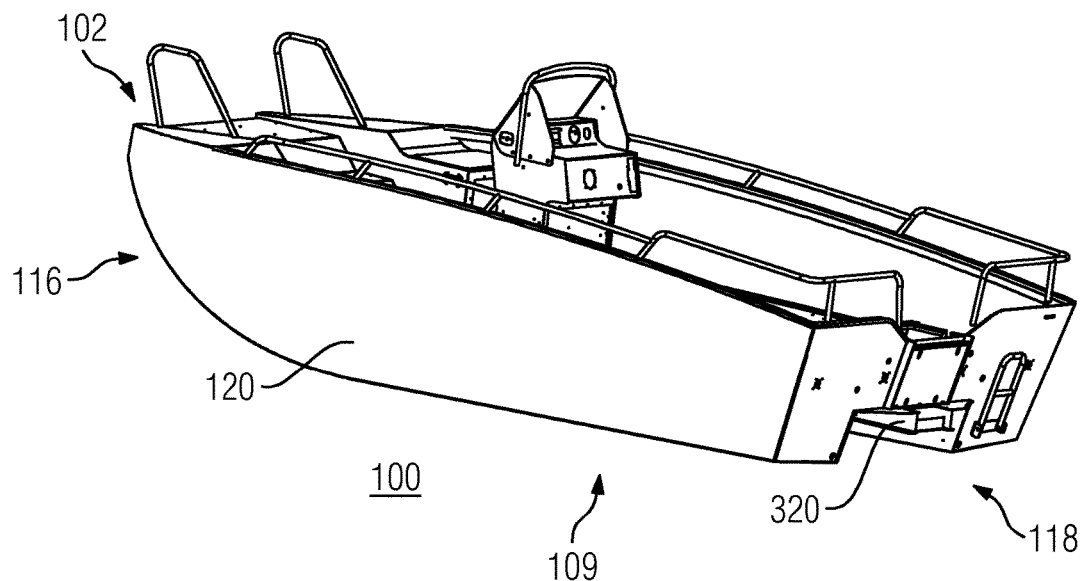
FIG. 6 shows a catamaran illustrated diagonally from the back, according to one embodiment.
Figure 7:
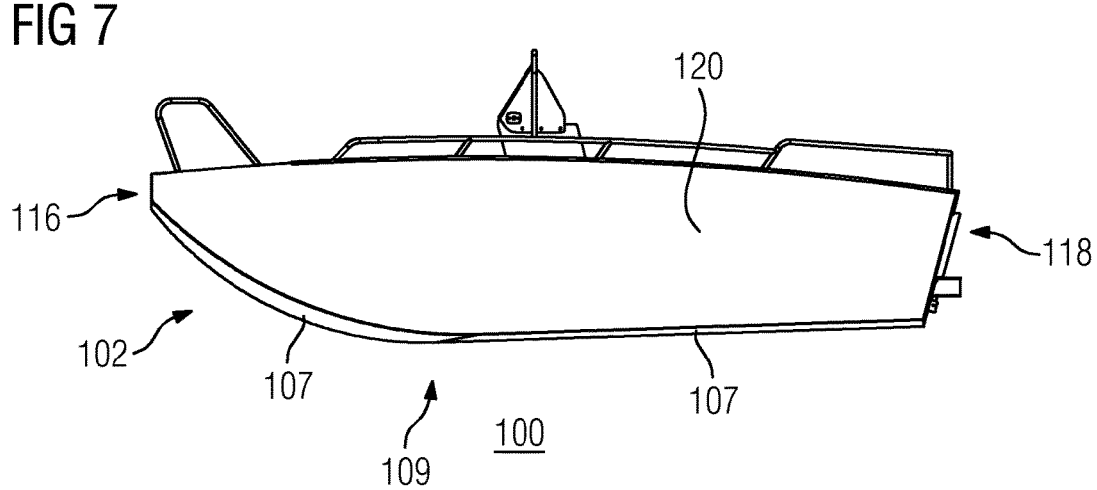
FIG. 7 shows a catamaran illustrated directly from the left side, according to one embodiment.

FIG. 6 and FIG. 7 show a side view of a catamaran 100, which has uniform shell plates 120 on the outer edges of the pontoons 106a, 106b. The shell plates 120 combine to each other the structures above and beneath the deck from the bow 116 to the stern 118. The shell plate 120 can be turned inwards 8-12° to angle γ from the vertical plane. In one embodiment, the angle γ is most preferably 10°.

Figure 8:
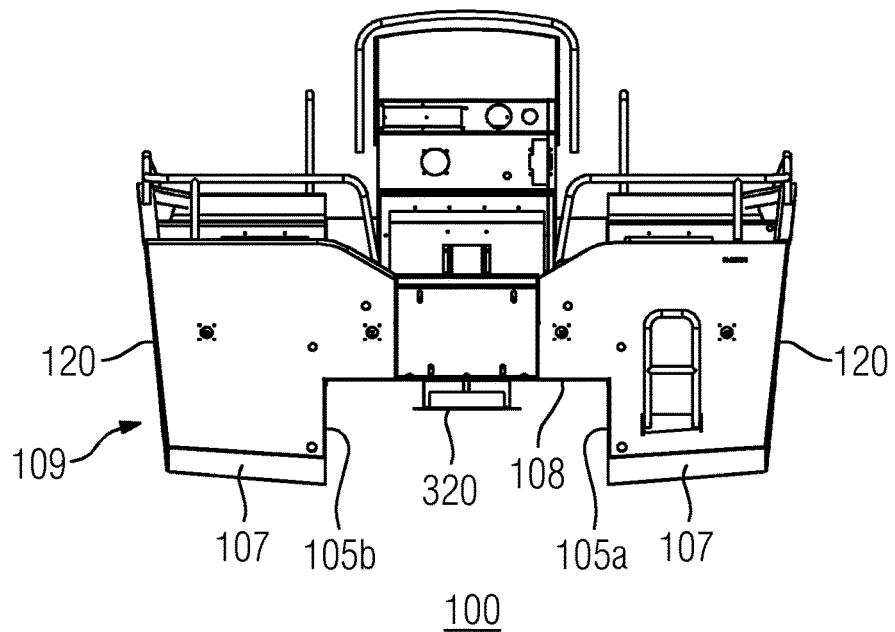
FIG. 8 shows a catamaran illustrated directly from the back, according to one embodiment.

FIG. 8 shows the stern 118 of the catamaran 100. The bottom plates 107 of the pontoons 106a, 106b descend downwards from the stern 118 to the direction of the bow 116 before curving upwards (also see FIG. 5 and FIG. 9).

Figure 9:
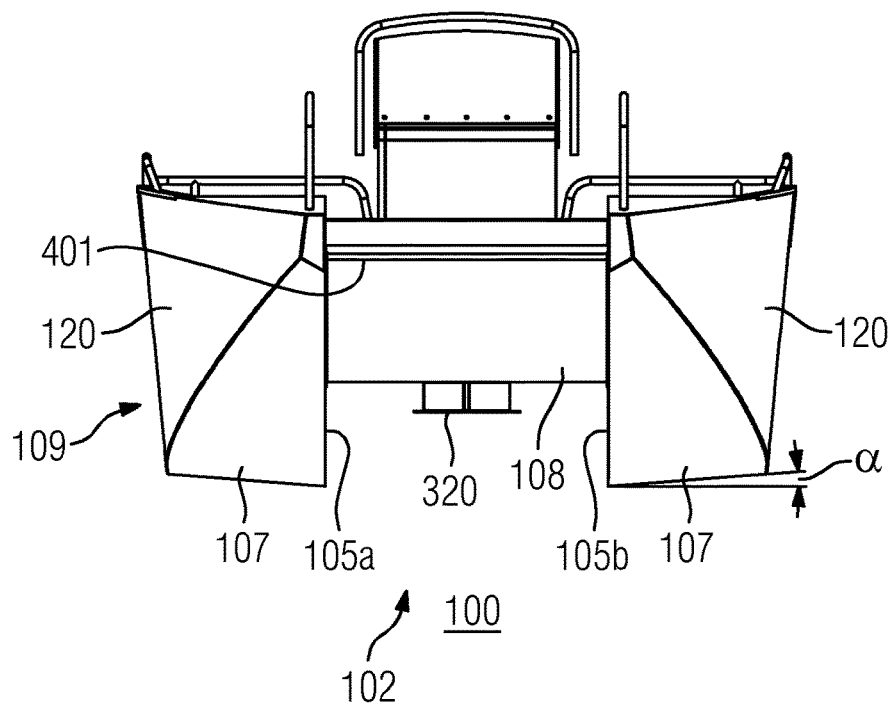
FIG. 9 shows a catamaran illustrated directly from the front, according to one embodiment.

FIG. 9 shows the catamaran 100 directly from the front. At the bow 116, the shell plate 120 curves 116 inwards, and the bottom 107 of the pontoons 106a, 106b curves upwards. The angle between the sides 105a, 105b and the bottom 107 of the pontoons is the sharpest at the bow 116 in an area, which is in the centre portion of the curving of the bottom 107. An increase in the angle α of the bottom 107 increases the cutting capacity of the bow when the bow meets a wave. A cutting bow also improves manoeuvrability especially at low speeds. At the starting point of the curving of the bottom 107, the draught of the catamaran 100 is the greatest when the catamaran 100 is floating in water so that the ceiling 108 of the centre tunnel 102 is in water 202a. The essentially vertical sides 105a, 105b and shell plates 120 function as longitudinal stabilisers and give directional stability in the longitudinal direction.

FIG. 10 shows the catamaran 100 from below. The bottom 107 of the pontoons 106a, 106b has been divided into a straight portion and a curved portion. Similarly, the ceiling 108 of the centre tunnel 102 has been divided into a stern-most portion 212 located closest to the stern 118, which stern-most portion 212 is straight, and into a bow-most portion 210 located closest to the bow 116, which bow-most portion 210 is cylindrically convex, and an essentially horizontal portion 401, which is also straight. The catamaran 100 can have a water guide module 320 on the ceiling 108 of the centre tunnel 102 in order to accomplish a laminar flow to the propeller of an outboard motor, the cavitation plate of which outboard motor is behind the water guide module 320 (also see FIG. 3 and FIG. 6).

FIG. 11 shows the catamaran 100 from above. The shell plates 120 are straight in the longitudinal direction and vertical direction except at the bow 116, where the shell plates 120 curve inwards (also see FIG. 5). The catamaran 100 does not have a separate gunwale, because the shell plates 120 rise sufficiently up, serving as the gunwale of the interior of the catamaran. At the essentially horizontal portion 401 of the ceiling 108 of the centre tunnel 102, the bow 116 of the catamaran is straight between the pontoons 105a, 106b in the width direction 302. The straight bow 116 facilitates the loading of the catamaran 100, and it is possible to install for example a bow port/ramp at the bow 116 of the catamaran 100.

It is possible to manufacture a catamaran according to the above-described embodiments from aluminium. The pontoons 106a, 106b and the ceiling 108 of the centre tunnel of the catamaran 100 have been manufactured from aluminium and belong to the hull 109 of the catamaran 100, which hull 109 has been manufactured from aluminium. The parts manufactured from aluminium have most preferably been joined together by welding, but it is also possible to use riveting, adhesive bonding or other joining methods applicable in the future.

The length of the catamaran 100' according to the above-described embodiments can be 3-10 m, most preferably 3-8.5 m.

For a person having ordinary skill in the art, it is obvious that as technology makes further progress, the basic idea of the invention can be implemented in many different ways. The invention and its embodiments are therefore not restricted to the examples described above, but they may vary within the claims and their legal equivalents.

LIST OF REFERENCE NUMBERS USED

α angle
β angle
γ angle
φ angle
$h_l$ distance
$h_v$ distance
d distance
d1 height
d2 distance
d3 distance
d4 distance
d5 width
d6 length
d7 length
100 catamaran
102 centre tunnel
105a side
105b side
106a pontoon
106b pontoon
107 bottom
108 ceiling of centre tunnel
109 hull
114 water guide plate
116 bow
118 stern
120 shell plate
201 longitudinal direction of catamaran
202a water (catamaran is stationary)
202b water (catamaran is moving)
202c water (catamaran is moving)
210 bow-most portion
212 stern-most portion
302 width direction of catamaran
320 water guide module
401 essentially horizontal portion
402 point of intersection

The invention claimed is:

1. A catamaran (100) which has a centre tunnel (102), the opposite sides (105a, 105b) of which form asymmetrical pontoons (106a, 106b), which are mirror images of each other, and which pontoons (106a, 106b) have buoyancy, which has been adapted so that when the catamaran (100) moves in water, the centre tunnel (102) functions as a combined water and air tunnel, and when the catamaran (100) is stationary in water, a ceiling region (108) of the centre tunnel (102) is in water, characterised in that:

the ceiling region (108) of the centre tunnel (102) curves in a cylindrically convex manner downwards when going from a bow region (116) of the catamaran (100) in a direction of a stern region (118) of the catamaran (100) only after an essentially horizontal portion (401) of distance (d), which essentially horizontal portion (401) is located between the pontoons (106a, 106b); and wherein both pontoons (106a, 106b) have bottom (107) comprising a straight portion and a curved portion located at the bow side from the straight portion;

wherein the curved portion of the bottom (107) is inclined in a width direction (302) of the catamaran (100) at an angle (α) upwards from the plane of the normal of the examination point at the edge of the surface of the side (105a, 105b) when the angle (α) opens to the direction of a shell plate (120), and which curved portion of the bottom (107) in the area of the bow (116) of the catamaran (100) from the stern (118) to the direction of the bow (116) has been curved upward and essentially at the same time turned inwards so that said angle (α) increases when moving from the area of the stern (118) of the catamaran (100) to the area of the bow (116).

2. The catamaran (100) according to claim 1, wherein in the centre tunnel (102) in the longitudinal direction (201) of the catamaran (100) there are two consecutive portions (210, 212), of which the bow-most portion (210) is at a greater angle towards the bow (116) than the stern-most portion (212).

3. A catamaran (100) according to claim 2, wherein the bow-most portion (210) located closest to the bow (116) is shorter than the stern-most portion (212) located closest to the stern (118), and wherein the stern-most portion (212) located closest to the stern (118) extends from the bow-most portion (210) located closest to the bow (116) towards the stern (118).

4. The catamaran (100) according to claim 1, wherein the pontoons (106a, 106b) have elongated water guide plates (114), which extend in their longitudinal direction (302) between the stern (118) and the bow (116) and in their width direction between the pontoons (106a, 106b).

5. The catamaran (100) according to claim 4, wherein the distance of the water guide plates (114) to the ceiling region (108) of the centre tunnel (102) decreases from the bow (116) towards the stern (118).

6. The catamaran (100) according to claim 1, wherein the catamaran (100) has a water guide module (320) on the ceiling region (108) of the centre tunnel (102) in order to accomplish a laminar flow to a propeller of an outboard motor, a cavitation plate of which outboard motor is behind the water guide module (320).

7. The catamaran (100) according to claim 1, wherein the catamaran (100) has uniform flank plates (120) on the outer edges of the pontoons (106a, 106b), which flank plates (120) combine to each other the structures above and beneath the deck from the bow (116) to the stern (118).

8. The catamaran (100) according to claim 1, wherein sides (105a, 105b) are essentially vertical, planar and parallel over the entire length of the centre tunnel 102.

9. The catamaran (100) according to claim 1, where a height (d1) of a mouth region of the centre tunnel (102) becomes lower after the essentially horizontal portion (401) over distance (d2) so that on the stern-most portion (212) located closest to the stern (118), the distance (d3) of the centre tunnel (102) from the bottom (107) of the pontoons (106a, 106b) is at its highest less than 50% of the height (d1) of the mouth of the centre tunnel 102 at the bow (116).

10. The catamaran (100) according to claim 1, wherein there is a point of intersection (402) between the surfaces of the bow-most portion (210) and the stern-most portion (212) of the ceiling region (108) of the centre tunnel (102), at which point of intersection (402) the gradients of the surfaces of the bow-most portion (210) and the stern-most portion (212) are equally great, and at which point of intersection (402) the distance (d3) of the ceiling region (108) of the centre tunnel (102) from the bottom (107) of the pontoons (106a, 106b) is greater than the distance (d4) of the ceiling region (108) of the centre tunnel (102) from the bottom (107) of the pontoons (106a, 106b) at the stern (118).

11. The catamaran (100) according to claim 1, wherein the pontoons (106a, 106b) and the ceiling region (108) of the centre tunnel (102) are manufactured from aluminium and belong to the hull (109) of the catamaran (100), which hull (109) has been manufactured from aluminium.

12. A catamaran (100) according to claim 1, wherein: the catamaran (100) has a water guide module (320) on the ceiling (108) of the centre tunnel (102) configured to provide a laminar flow to the propeller of an outboard motor, and wherein a cavitation plate of an outboard motor is behind the water guide module (320).

13. A catamaran (100) according to claim 12, wherein: the water guide module (320) is arranged to guide the water mass flowing in the centre tunnel (102) from the bow (116) towards the stern (118) so that the collision of the water mass and the outboard motor above the propeller can be prevented completely or at least partially.

* * * * *